United States Patent
Harrison et al.

(10) Patent No.: US 9,618,344 B2
(45) Date of Patent: Apr. 11, 2017

(54) DIGITAL MAP TRACKING APPARATUS AND METHODS

(71) Applicants: Brett Harrison, Las Vegas, NV (US); Bradley Denn, Tucson, AZ (US); Phillip Reason, Vacaville, CA (US)

(72) Inventors: Brett Harrison, Las Vegas, NV (US); Bradley Denn, Tucson, AZ (US); Phillip Reason, Vacaville, CA (US)

( * ) Notice: Subject to any disclaimer, the term of this patent is extended or adjusted under 35 U.S.C. 154(b) by 36 days.

(21) Appl. No.: 14/565,291

(22) Filed: Dec. 9, 2014

(65) Prior Publication Data

US 2016/0161259 A1    Jun. 9, 2016

(51) Int. Cl.
G01C 21/00  (2006.01)
G01C 21/16  (2006.01)
G01S 19/51  (2010.01)
G01S 19/48  (2010.01)

(52) U.S. Cl.
CPC ......... *G01C 21/005* (2013.01); *G01C 21/165* (2013.01); *G01S 19/48* (2013.01); *G01S 19/51* (2013.01)

(58) Field of Classification Search
CPC ...... G01C 21/26; G01C 21/32; G01C 21/005; G01C 21/165; G01S 19/51
USPC ........ 701/409, 466, 469, 431, 433; 340/905; 345/633; 455/457
See application file for complete search history.

(56) References Cited

U.S. PATENT DOCUMENTS

| | | | |
|---|---|---|---|
| 6,304,819 B1 | 10/2001 | Agnew et al. | |
| 6,498,984 B2 | 12/2002 | Agnew et al. | |
| 7,408,137 B2 | 8/2008 | Sawachi | |
| 7,480,514 B2 | 1/2009 | Karaoguz et al. | |
| 7,729,851 B2 | 6/2010 | Yamashita et al. | |
| 8,041,503 B2 | 10/2011 | Choi et al. | |
| 8,386,171 B2 | 2/2013 | Park | |
| 8,463,299 B1 | 6/2013 | Hladik et al. | |
| 8,554,472 B2 | 10/2013 | Lee et al. | |
| 8,756,009 B2 * | 6/2014 | Arai | G01C 21/32 701/457 |
| 8,943,420 B2 * | 1/2015 | Goldthwaite | G06F 3/04815 345/633 |

(Continued)

OTHER PUBLICATIONS

Navigation System Provides Direction—Even Without GPS, The Ohio State University, College of Engineering, Jan. 12, 2011. https://engineering.osu.edu/news/2011/01/navigation-system-provides-direction-even-without-gps.

(Continued)

*Primary Examiner* — Tan Q Nguyen
(74) *Attorney, Agent, or Firm* — Cesari & Reed LLP; R. Michael Reed (57) ABSTRACT

In an embodiment, an apparatus may include a circuit that has a first input to receive motion data from at least one of a motion sensor and an optical sensor and that has a second input to receive directional data corresponding to the motion data. The circuit may further include an input/output interface configured to provide data to a display and a control circuit coupled to the first input, the second input, and the input/output interface. The control circuit may be configured to determine a current position based at least in part on the motion data and the directional data and update an indicator on a digital map based on the current position determined from the motion data.

20 Claims, 9 Drawing Sheets

(56) References Cited

U.S. PATENT DOCUMENTS

| | | | |
|---|---|---|---|
| 9,002,647 B1* | 4/2015 | Sheridan | G01C 21/3644 340/995.2 |
| 9,097,553 B2* | 8/2015 | Kurtti | G01C 21/3679 |
| 2004/0105573 A1* | 6/2004 | Neumann | G06T 17/00 382/103 |
| 2006/0227047 A1* | 10/2006 | Rosenberg | G01S 5/0054 342/357.55 |
| 2007/0009863 A1 | 1/2007 | Hart et al. | |
| 2007/0143016 A1 | 6/2007 | Kung et al. | |
| 2007/0225905 A1 | 9/2007 | Yamashita et al. | |
| 2008/0045138 A1* | 2/2008 | Milic-Frayling | H04N 1/00244 455/3.04 |
| 2008/0177709 A1 | 7/2008 | Chiu et al. | |
| 2009/0005981 A1* | 1/2009 | Forstall | G01C 21/20 701/431 |
| 2009/0037099 A1 | 2/2009 | Joshi | |
| 2009/0100342 A1 | 4/2009 | Jakobson | |
| 2009/0198767 A1 | 8/2009 | Jakobson et al. | |
| 2010/0023255 A1 | 1/2010 | Nambata | |
| 2010/0042313 A1 | 2/2010 | Kang | |
| 2010/0123737 A1* | 5/2010 | Williamson | G01C 21/3647 345/672 |
| 2010/0146436 A1 | 6/2010 | Jakobson et al. | |
| 2010/0241353 A1 | 9/2010 | Park | |
| 2011/0013014 A1 | 1/2011 | Wassingsbo | |
| 2011/0163874 A1* | 7/2011 | van Os | G01C 21/367 340/539.13 |
| 2011/0196897 A1* | 8/2011 | Koch | G01C 21/00 707/792 |
| 2012/0016579 A1 | 1/2012 | Lee et al. | |
| 2012/0166074 A1 | 6/2012 | Weng et al. | |
| 2012/0185206 A1 | 7/2012 | Zehler | |
| 2012/0274481 A1* | 11/2012 | Ginsberg | G08G 1/096883 340/905 |
| 2012/0277993 A1 | 11/2012 | Mund | |
| 2012/0303263 A1* | 11/2012 | Alam | G01C 21/32 701/410 |
| 2013/0187952 A1* | 7/2013 | Berkovich | G01S 5/16 345/633 |
| 2013/0311087 A1 | 11/2013 | Yeh | |
| 2013/0324164 A1* | 12/2013 | Vulcano | H04W 4/02 455/457 |
| 2014/0123047 A1 | 5/2014 | Solarino | |
| 2014/0267589 A1* | 9/2014 | Matsubara | H04N 5/23238 348/36 |

OTHER PUBLICATIONS

Lawson, Ten Ways Your Smartphone Knows Where You Are, PCWorld, Phones, Apr. 6, 2012. http://www.pcworld.com/article/253354/ten_ways_your_smartphone_knows_where_you_are.html.

Quick, Smartphone app determines location, speed and direction of distant objects, Gizmag, Mobile Technology, Aug. 30, 2012. http://www.gizmag.com/location-tracking-smartphone-app/23946/.

* cited by examiner

DIGITAL MAP TRACKING APPARATUS AND METHODS

FIELD

The present disclosure is generally related to devices, systems, and methods of tracking movement on a digital map, and more particularly to devices, systems and methods of tracking movement based on motion sensor data.

BACKGROUND

Electronic devices, such as smart phones and other computing devices, may execute software configured to render and display maps. In some examples, the electronic devices may interact with global positioning satellites to determine a geophysical location of the electronic device and to update the position of an indicator of the electronic device on a digital map, which may be presented to a display of the electronic device. One possible example of such a system may provide automotive driving instructions to guide a driver to a selected destination.

SUMMARY

In some embodiments, an apparatus may include a circuit that has a first input to receive motion data from at least one of a motion sensor and an optical sensor and that has a second input to receive directional data corresponding to the motion data. The circuit may further include an input/output interface configured to provide data to a display and a control circuit coupled to the first input, the second input, and the input/output interface. The control circuit may be configured to determine a current position based at least in part on the motion data and the directional data and update an indicator on a digital map based on the current position determined from the motion data.

In other embodiments, a method may include determining a current position based on data from at least one of a motion sensor and an optical sensor of an apparatus and updating an indicator representing the current position on a digital map provided to a display associated with the apparatus in response to determining the current position.

In still other embodiments, a data storage device may include instructions that, when executed, cause a processor to determine a current position based on data from at least one of a motion sensor and an optical sensor. The data storage device may further include instructions that, when executed, cause the processor to update a position of an indicator on a digital map based on the current position.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

One or more aspects or features of the subject matter described herein can be realized in digital electronic circuitry, integrated circuitry, specially designed application specific integrated circuits (ASICs), field programmable gate arrays (FPGAs) computer hardware, firmware, software, or combinations thereof. These various aspects or features can include implementation in one or more computer programs that are executable or interpretable on a programmable system including at least one programmable processor, which can be special or general purpose, coupled to receive data and instructions from, and to transmit data and instructions to, a storage system, at least one input device, and at least one output device. These computer programs, which can also be referred to as programs, software, software applications, applications, components, or code, include machine instructions for a programmable processor, and can be implemented in a high-level procedural or object-oriented programming language, or in assembly/machine language.

Embodiments of systems, methods, and apparatuses are described below that can be configured to determine movement of a device in order to determine a current position (relative to a previously known position), to correlate the movement to a digital representation of the surrounding terrain, and to update a position of an indicator on a digital map to reflect the current position. In some embodiments, the movement may be determined based on sensor data, such as pedometers, speedometers, motion sensors, or any combination thereof. In some embodiments, movement data may be supplemented by visual data determined from one or more optical sensors or from input data provided by a user. In some embodiments, the movement data, the optical data, or both movement and optical data may augment global positioning satellite (GPS) data, when available, to enhance the accuracy of the GPS data with respect to the actual geophysical location of the device.

In some embodiments, the apparatus may be a hand-held electronic device, such as a smart phone or other device, which may be battery powered and which may carried or worn by a user. In some embodiments, the apparatus may be coupled to a larger system, such as an automobile or a boat, and, in some instances, may couple to on-board computing systems to determine the location of the electronic device. In some embodiments, the apparatus may be integrated within a larger system, such as an automotive system, an aeronautical system, another system, or any combination thereof. An example of an electronic device configured to track movement on a digital map is described below with respect to FIG. 1.

Figure 1:
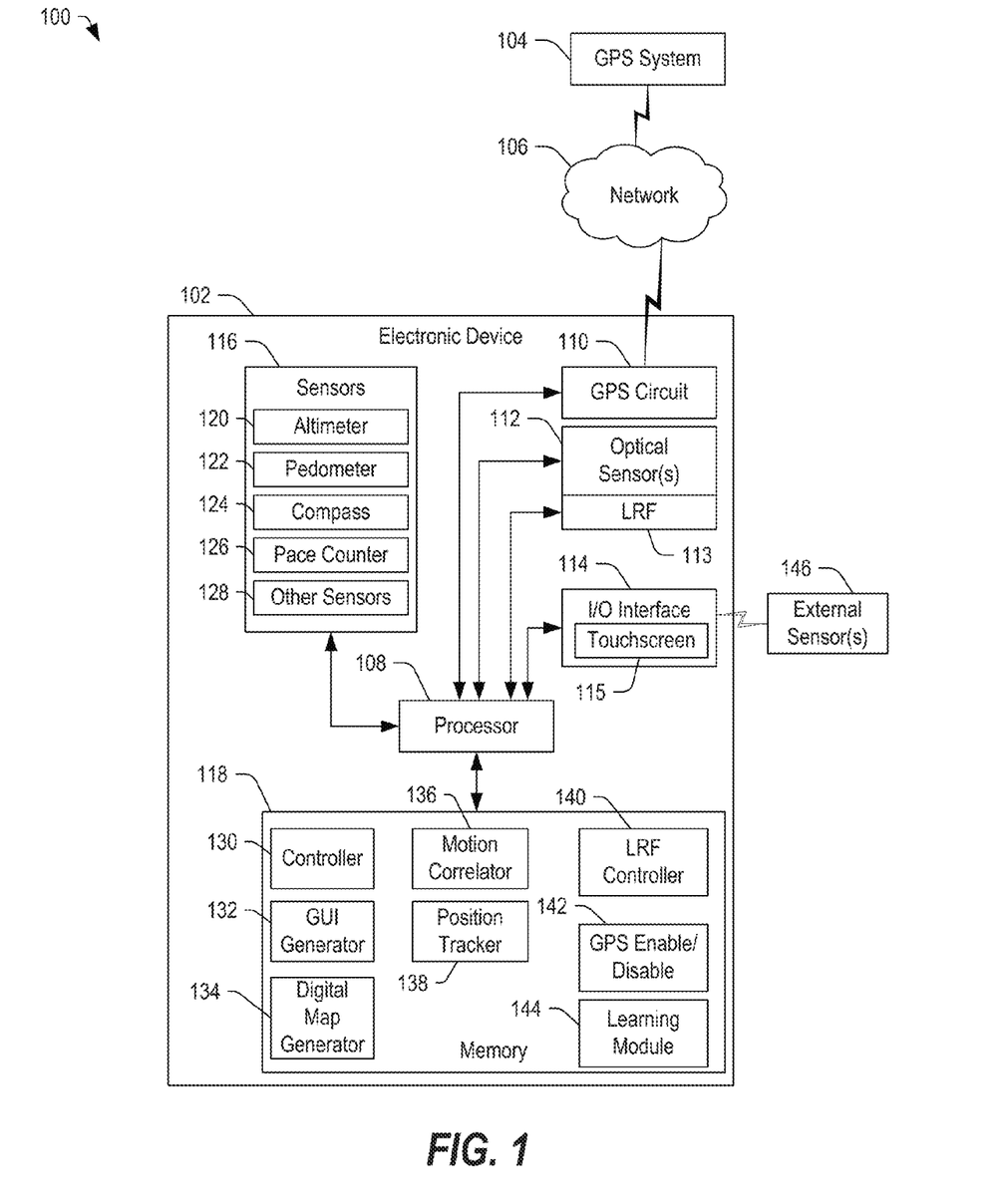
FIG. 1 is a block diagram of a system including an apparatus to track movement on a digital map, in accordance with some embodiments of the disclosure.

FIG. 1 is a block diagram of a system 100 including an apparatus to track movement on a digital map, in accordance with some embodiments of the disclosure. The apparatus may be an electronic device 102, which may be a portable computing device, such as a smart phone, a tablet computer, a laptop computer, another data processing device, or any combination thereof. The electronic device 102 may be configured to communicate with a global positioning satellite (GPS) system 104 through a network 106 to receive GPS data specifying a geophysical location of the electronic device 102.

The electronic device 102 may include a processor 108 coupled to a GPS circuit 110 that may be configured to communicate with the GPS system 104. The electronic device 102 may also include one or more optical sensors 112 coupled to the processor 108. In some embodiments, the electronic device 102 may further include a laser range finder (LRF) circuit 113. The electronic device 102 may also include an input/output (I/O) interface 114, which may include one or more connection ports configured to couple to external devices (such as one or more external sensors 146) and which may include a touchscreen 115. The touchscreen 115 may be configured to display images and text and to receive inputs via user interactions with user-selectable elements presented on the touchscreen 115.

The electronic device 102 may also include one or more sensors 116 coupled to the processor 108. The sensors 116 may include an altimeter 120, a pedometer 122, a compass 124, a pace counter 126, other sensors 128, or any combination thereof. In some embodiments, the sensors 116 may include gyroscopes, accelerometers, and other movement sensors. In some embodiments, the compass 124 may be a gyroscopic x, y, and z-axis compass, which may be calibrated using GPS data. The compass 124 may include a "lock and stow" feature that allows it to understand the difference, in degrees, between the direction of travel and the position of the compass 124 on the user's body. The altimeter 120 may be recalibrated periodically or in response to a reset operation. During recalibration, the altimeter 120 may utilize elevation data from the location provided on a map, from GPS coordinates, or based on other inputs. Further, the altimeter 120 may measure changes in altitude during periods of time between recalibrations. The recalibration process may defeat errors caused by changes in barometric pressure that can be caused by inclement weather. In some embodiments, digital contour lines in the digital map data may be used in conjunction with altitude data from the altimeter 120 as location buffer data to ensure an accurate fix during significant elevation changes.

The electronic device 102 may further include a memory 118 coupled to the processor 108. The memory 118 may be configured to store data and to store instructions that, when executed, may cause the processor 108 to determine location data associated with the electronic device 102 and to update an indicator representing the location data on a digital map. The memory 118 may include a controller 130 that, when executed, may control operation of the electronic device 102. The memory 118 may further include a graphical user interface (GUI) generator 132 that, when executed, may cause the processor 108 to generate a user interface including one or more user-selectable elements (buttons, tabs, menus, text fields, etc.). The memory 118 may also include a digital map generator 134 that, when executed, may cause the processor 108 to provide a digital map within the GUI.

The memory 118 may further include a motion correlator 136 that, when executed, may cause the processor 108 to correlate data from the sensors 116, the optical sensors 112, the GPS circuit 110, or any combination thereof, to the physical world represented by the digital map. The memory 118 may also include a position tracker 138 that, when executed, may cause the processor 108 to determine a current location of the electronic device based on the correlated data and to update the current location by adjusting a position of an indicator within the digital map. In some embodiments, the memory 118 may include a laser range finder (LRF) controller 140 that, when executed, may cause the processor 108 to control the LRF circuit 113. The memory 118 may further include a GPS enable/disable module 142 that, when executed, may cause the processor 108 to selectively disable or enable the GPS circuit 110. Additionally, the memory 118 may include a learning module 144 that, when executed, may cause the processor 108 to learn pace and other information associated with a particular user.

In some embodiments, the electronic device 102 may be calibrated when the GPS circuit 110 is enabled to provide user-specific, pace count learning. In some embodiments, the GPS circuit 110 receives GPS location data in conjunction with receipt of pedometer data from the pedometer 122 and orientation data from the altimeter 120 and the compass 124 while the processor 108 executes the learning module 144 to learn the user's stride, as it correlates to actual progress in the real world (and as the movement is presented on a digital map provided to the touchscreen 115). The learning module 144 can operate in the background, continuously "learning", allowing the electronic device 102 to learn about the user over time, until the user wants to enter a non-learning mode, such as a "shadow mode," which is a GPS signal free mode. During the learning mode, the learning module 144 may perform slope error calculations automatically to correct errors between user's current position and planned waypoints within a threshold range along the direction of travel, mitigating "step to distance" errors, which may be caused by two-dimensional versus three-dimensional map distances. In some embodiments, the user may interact with the touchscreen 115 to override all inputs, and simply reset his/her position indicator when he is at a known point. In some embodiments, the various inputs from the GPS circuit 110, the optical sensors 112, the LRF 113, the sensors 116, the touchscreen 115, and other inputs may be prioritized in terms of reliability. One possible prioritization order may include a hard reset from GPS, optical landmark recognition or user input, pace and heading inputs, GPS inputs, and altimeter inputs.

In some embodiments, external sensors 146 may be provided in the user's shoes that read separation from each other, providing enhanced pace count accuracy. The pace count information may be correlated to movement on the digital map.

In some embodiments, the electronic device 102 may determine a digital map corresponding to a physical location of the electronic device 102. The electronic device 102 may determine the digital map based on a user selection or a current GPS location. Further, the digital map may be retrieved from a plurality of digital maps stored in the memory 118, may be installed by the user (such as via a thumb drive coupled to the I/O interface 114), or may be retrieved from a server via the network 106. In some embodiments, the electronic device 102 may be configured to generate a digital map based on data from the optical sensors 112, the LRF 113, and the sensors 116. In a particular example, the electronic device 102 may determine range data and orientation data for one or more objects within a field of view of the optical sensors 112 and may generate a digital map corresponding to the scanned view area, which map may be presented to the user via the GUI.

Once a map is selected or generated, the electronic device 102 may position an indicator on the digital map to represent a physical position of the electronic device 102. The position of the electronic device 102 may be determined based on GPS coordinates from the GPS circuit 110. In some embodiments, such as when the GPS circuit 110 is disabled or the GPS signal is not available, the electronic device may determine the physical position of the electronic device 102 based on available optical data, such as correlation of a relative distance and orientation to an object that is within the view area of the optical sensors 112 and that is represented on the digital map.

In some embodiments, the electronic device 102 may detect movement based on signals from sensors 116, which movement data may be processed to determine a change in the physical position of the electronic device 102. The processor 108 may execute the motion correlator 136 to correlate the movement data to the digital map representing the physical area and may provide the correlated data to the position tracker 138, which may be utilized to update the position of the indicator on the digital map to represent the change the location of the electronic device 102 in the real world.

In some embodiments, the electronic device 102 may determine the movement based on data from the pedometer 122 as well as directional data from the compass 124 and altitude data from the altimeter 124. Further, the electronic device 102 may utilize data from the other sensors 128, such as gyroscopes and other sensors, to determine a movement vector in three dimensions, which movement data can be correlated to the topographical features of the digital map. In some embodiments, the electronic device 102 may be configured to capture optical data corresponding to constellations and may be configured to determine movement of the electronic device 102 based on changes in the relative position of the constellations over time as determined relative to a precise directional indicator, such as a digital compass heading.

In certain embodiments, the electronic device 102 may determine a current position in the real world without using GPS coordinates, allowing the electronic device 102 to track movement and to determine position information even when GPS information is intermittent or unavailable. In some embodiments, the electronic device 102 may determine the position information based on movement relative to an initial position, which movement and position information may be correlated to the digital map so that the current position of the electronic device may be represented accurately. In the event that GPS is available, the electronic device 102 may enhance the GPS data with adjustments based on movement data and optical data to refine the GPS position information.

In some embodiments, when not in the "shadow" (non-GPS) mode, the electronic device 102 may perform automatic, intermittent GPS fixes during travel, to check tracking while conserving battery. In some embodiments, the intermittent GPS fixes may be configured to update the current position up to approximately 3 m of accuracy, or approximately 5 minutes of searching for signal, whichever occurs first. In some embodiments, when a route is loaded, the electronic device 102 may have the ability to determine landmarks or objects associated with the route, such as turns, structures, and so on. The electronic device 102 may selectively retrieve GPS coordinate data when in proximity to those landmarks or objects. In some embodiments, the electronic device 102 may also recognize non critical portions of the route (such as lengthy stretches of road with no turns) and may minimize GPS usage during such portions to conserve battery power and processing power.

Figure 2:
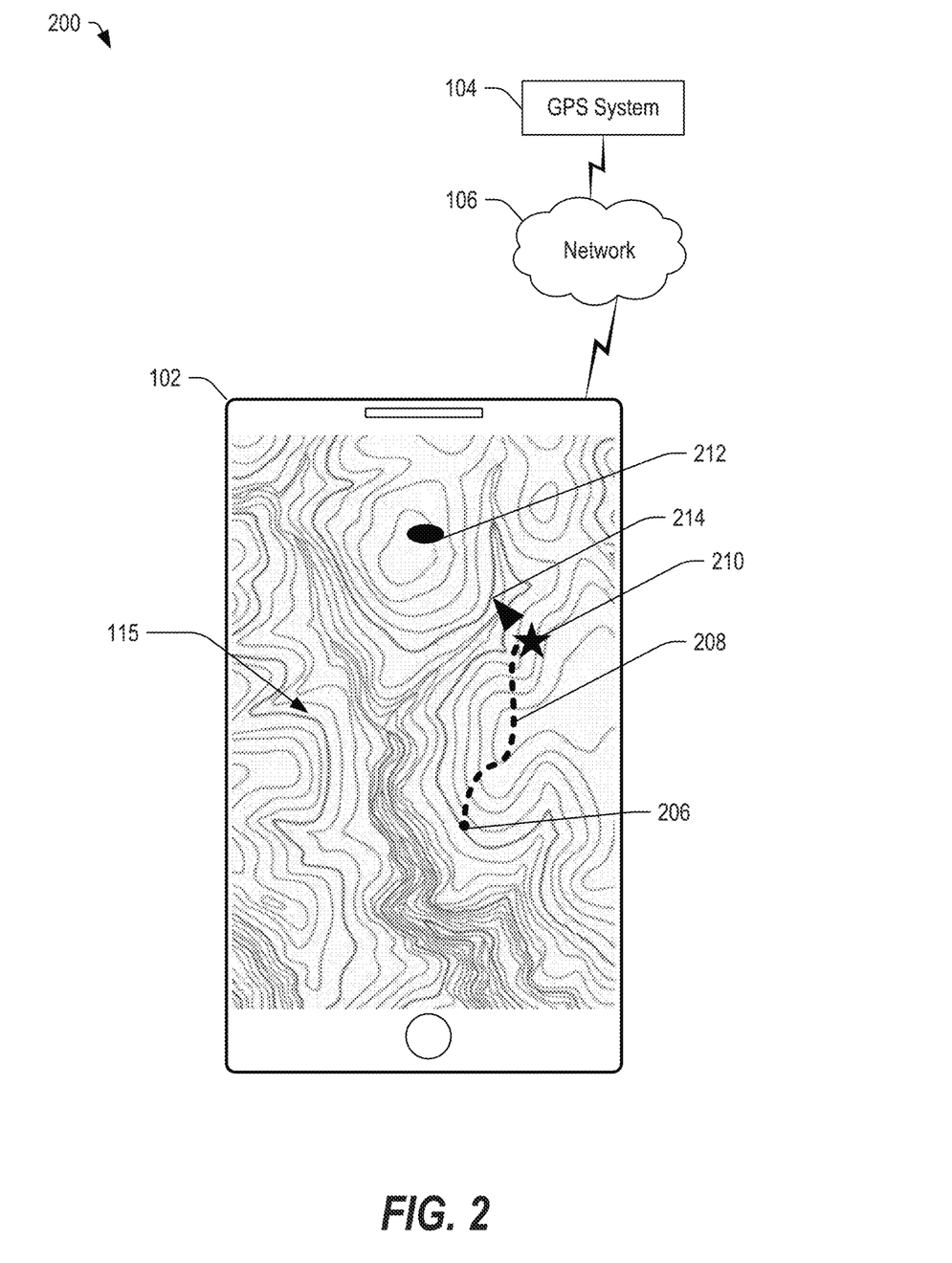
FIG. 2 is a diagram of a system including an apparatus to track movement on a digital map, in accordance with some embodiments of the disclosure.

FIG. 2 is a diagram of a system 200 including an apparatus (such as the electronic device 102) to track movement on a digital map, in accordance with some embodiments of the disclosure. The system 200 includes all of the elements of the system 100 in FIG. 1. The electronic device 102 includes a touchscreen interface 115, which, in this example, depicts a topographical map (an example of a digital map) including a starting location 206, a dashed line showing a path 208 traversed, and a current location (current position) 210 of the electronic device 102. The map may further include a selected destination 212, which may be set by a user, such as by touching the touchscreen 115. The map may further include a directional indicator, such as arrow 214, indicating the direction the user must turn toward in order to reach the selected destination 212.

In some embodiments, as a user walks while holding the electronic device 102 in his/her hand, the electronic device 102 may update the directional indicator by moving it on the display to correspond to the user's movement relative to the real world as represented by the digital map. As the user turns or changes direction, the orientation of at least one of the directional indicator 214 and the digital map may also change relative to the orientation of the touchscreen 115 to assist the user in orienting and reaching the selected destination. As discussed above, the electronic device 102 may determine the current position based on GPS data, movement data, optical data, range data, or any combination thereof.

Figure 3:
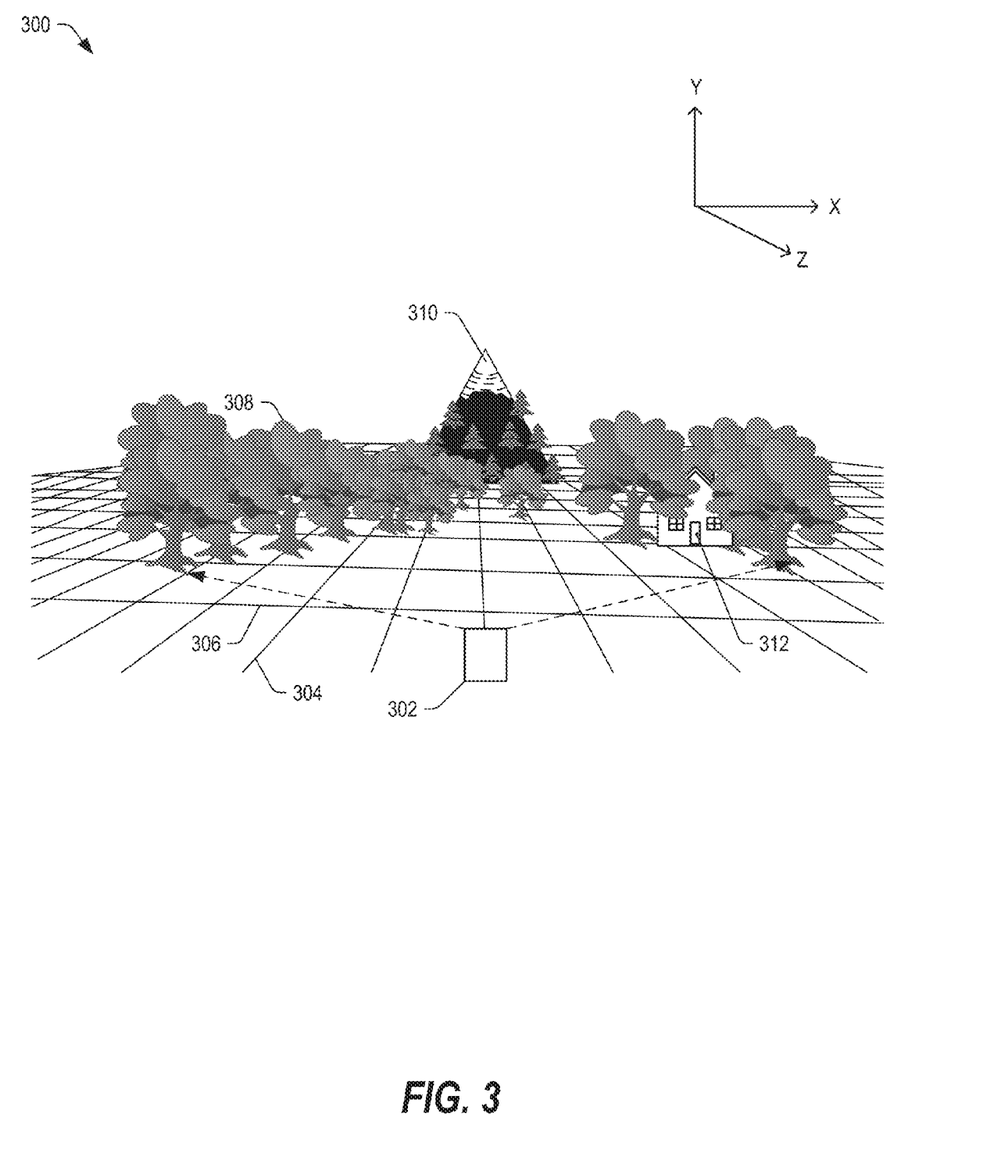
FIG. 3 is a diagram of a digital representation of a portion of a digital map on which movement may be tracked, in accordance with some embodiments of the disclosure.

FIG. 3 is a diagram of a digital representation of a portion of a digital map 300 on which movement may be tracked, in accordance with some embodiments of the disclosure. The digital map 300 may be a digital rendering of a stored map, may be generated from optical data combined with range data, or any combination thereof. The digital map 300 may include an indicator 302 corresponding to a position of the electronic device 102. Further, the electronic device 102 may divide the digital landscape into grid lines, such as lines 304 and 306, which may be used to determine distance traveled in the digital realm. Physical objects, such as trees 308, mountains 310, and other structures 312 may be represented as well.

The digital map 300 may be pre-rendered, turning satellite and elevation data of real terrain into a virtual 3D environment. An avatar 302 representing the user or the electronic device 102 may be moved through the virtual 3D environment, progressed accurately using data input by physical events (pace counter, altimeter, compass) for the purpose of real world navigation.

As the user moves in the real world, motion data may be determined from movement data determined by sensors 116, from optical data determined from optical sensors 112, from range data from the LRF 113, or any combination thereof. The motion data may be correlated to the grid lines 304 and 306 in the digital map 300, and at least one of the position of the indicator 302 and the relative positions of the objects (i.e., the trees 308, the mountain 310, and the structure 312) may be updated in response to the motion data.

It should be appreciated that the digital map 300 is an illustrative example, which may parallel tracking of movement in gaming environments. However, the grid lines 304 and 306 and the tracking of movements in this example utilizes the actual movement data determined using the sensors, rather than joystick-type gaming instructions on which a game application may operate. By utilizing the motion data, including directional data, elevation data and the like, the relative movement of the electronic device may be determined relative to the digital map 300, and such movement may be tracked to provide an indication of the position of the electronic device 102.

In some embodiments, the digital map 300 may be internal to the electronic device 102, while the shown on the touchscreen 115 in FIG. 2 is actually presented. However, the electronic device 102 may utilize the movement-tracking aspect of the grid lines 304 and 306 to track movement and to correlate the movement to the distance represented in the digital map.

Figure 4:
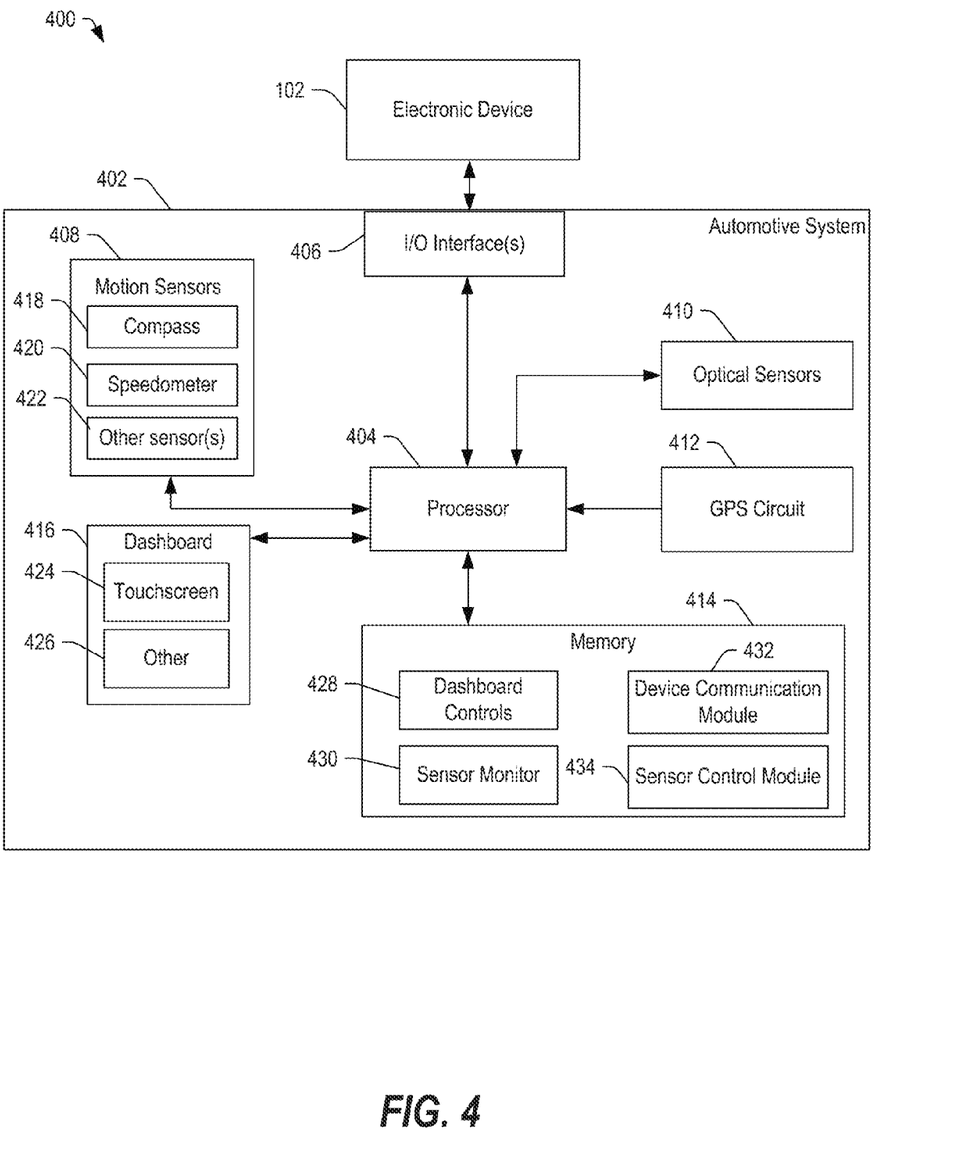
FIG. 4 is a block diagram of a system including an automotive system configured to track movement on a digital map, in accordance with some embodiments of the disclosure.

FIG. 4 is a block diagram of a system 400 including an automotive system 402 configured to track movement on a digital map, in accordance with some embodiments of the disclosure. The system 400 may include the electronic device 102 configured to couple to the automotive system 402. In some embodiments, the electronic device 102 may be integrated into the on-board electronics of the automotive system 402.

In some embodiments, the automotive system 402 may include a processor 404, which may be coupled to the electronic device 102 through an input/output (I/O) interface 406. The processor 404 may be coupled to one or more motion sensors 408, optical sensors 410, a GPS circuit 412, and a memory 414. The processor 404 may also be coupled to one or more components of a dashboard 416 of the vehicle, such as a touchscreen 424 and other elements 426.

In some embodiments, the motion sensors 408 may include a compass 418, a speedometer 420, and other sensors 422. The other sensors 422 may include slip control sensors, rim or tire sensors, axial rotation sensors (which may be located on the rims or axles of the vehicle, and so on).

In some embodiments, the memory 414 may include data (such as stored maps and other information) and may include instructions that, when executed, cause the processor 404 to communicate with the electronic device 102 to determine a position of the vehicle. In some embodiments, the memory 414 may include a dashboard control module 428 that, when executed, causes the processor 404 to update data on the dashboard elements, such as a digital speedometer, a digital fuel gauge, other digital dashboard components, the GUI presented on the touchscreen 424, and other elements.

In some embodiments, the automotive system 402 may present a GUI including a digital map having an indicator representing a position of the automotive system 402 relative to the locations represented by the digital map. In some embodiments, the position of the indicator on the digital map may be moved to represent movement sensed by the motion sensors 408 or may be moved to reset the location of the indicator in response to optical data from the optical sensors 410, in response to a user input, or in response to GPS data.

In a shadow mode, such as when GPS is disabled or unavailable, the processor 404 may determine movement of the automotive system 402 based on motion data from the motion sensors 408. In some embodiments, the processor 404 may communicate the motion data, optical data, and other data to the electronic device 102, which may correlate the motion data to a digital map to update the position of an indicator on the digital map to reflect the movement data. The electronic device 102 may provide data related to at least one of the indicator and the digital map to the automotive system 402 for display on the touchscreen 424. In some embodiments, the correlating functions, the position tracking functions, and map updating functions may be performed by the automotive system 402 without the assistance of the external electronic device 102.

In some embodiments, the motion sensors 408 may include one or more sensors external to the automotive system 402. In a particular example, the motion sensors 408 may include two sensors that may be positioned inside of a wheel well. One of the sensors may be fixed on the axle, and the second piece inside of the rim. These sensors count rotations and live feed the data to the processor 404 via the I/O interface 406 (in FIG. 4). In some embodiments, the signals from the two sensors allow the processor 404 to determine the differential rotations.

In some embodiments, the optical sensors 410 may include front-facing, side-facing, downward facing, or any combination thereof. In some embodiments, the optical sensors 410 may include a downward facing camera or laser range finder that uses road texture to calculate exact speed of travel. In some embodiments, the optical sensors 410 may have a set field of view and optical signals from the optical sensors 410 may be used to track the speed at which the little features of the road surface pass by, most likely in frames per second, to maximize accuracy. The laser range finding circuit can use the rapidity of its reflections off of the textural features of the road (range to such features and changes in range over time) to measure speed. Used in conjunction with the GPS coordinates, the laser range finding circuit or the optical sensors 410 may be used to facilitate pace counter or learning. In conjunction with GPS, the processor 404 can execute a learning module, such as learning module 144 in FIG. 1, which may be incorporated in memory 414. The learning module 144 may utilize the sensor data and the GPS data to learn driving nuances specific to the user, as the vehicle's movement correlates to actual progress on the map. This learning module may run in the background, continuously "learning" until the GPS signal is lost or disabled, i.e., when the automotive system 402 enters a "Shadow" mode.

In some embodiments, over time, tire tread wear may affect distance traveled per rotation, thereby affecting accuracy of rim/axle sensors. The GPS-enabled learning/monitoring using the learning module, may help to detect these subtle changes and account for them.

In some embodiments, the motion sensors 408 may include a digital compass, which may provide a gyroscopic x, y and z axis directional signal, which may be calibrated based on the GPS data, automatically. When the GPS data indicates that device is progressing along a road with a known bearing, the compass may be calibrated to reflect the known bearing. Intermittent checks can be performed to provide intermittent GPS fixes. In shadow mode (i.e., when GPS is not available or disabled), the processor 404 may rely on all other inputs to determine that the device is progressing down a road of a known azimuth. If the heading on the compass is in conflict with the known road, the compass can be re-calibrated to match the known azimuth. Further, in some instances, the sensor data may be used to detect contours, identify changes in heading, and so on to determine and correlate motion data to progress on the digital map through all turns and bends, even when GPS is disabled or unavailable. It is also possible to provide a calibrated digital altimeter, which may be recalibrated at regular intervals based on elevation data from provided by the GPS, map data, or by other inputs. Between calibrations, the altimeter may measure changes in altitude. Errors detected at recalibration may be accounted for and may be used to adjust the altimeter measurements in the future. Digital contour lines in the map data may be used in conjunction with the altimeter as location buffers, to ensure an accurate fix during significant elevation changes. Further, the motion sensors 408 may include a tilt sensor configured to identify gradient and to use the gradient data to rectify location on the road map, which may include elevation data.

In some embodiments, the optical sensors 410 may include upward-facing optical sensors that may be configured to sense overpasses and traffic lights. Such sensed data may be used to reset the positional data during navigation. Further, side-facing optical sensors may be used to detect structures, landmarks, intersections and the like in order to reset the positional data.

Figure 5:
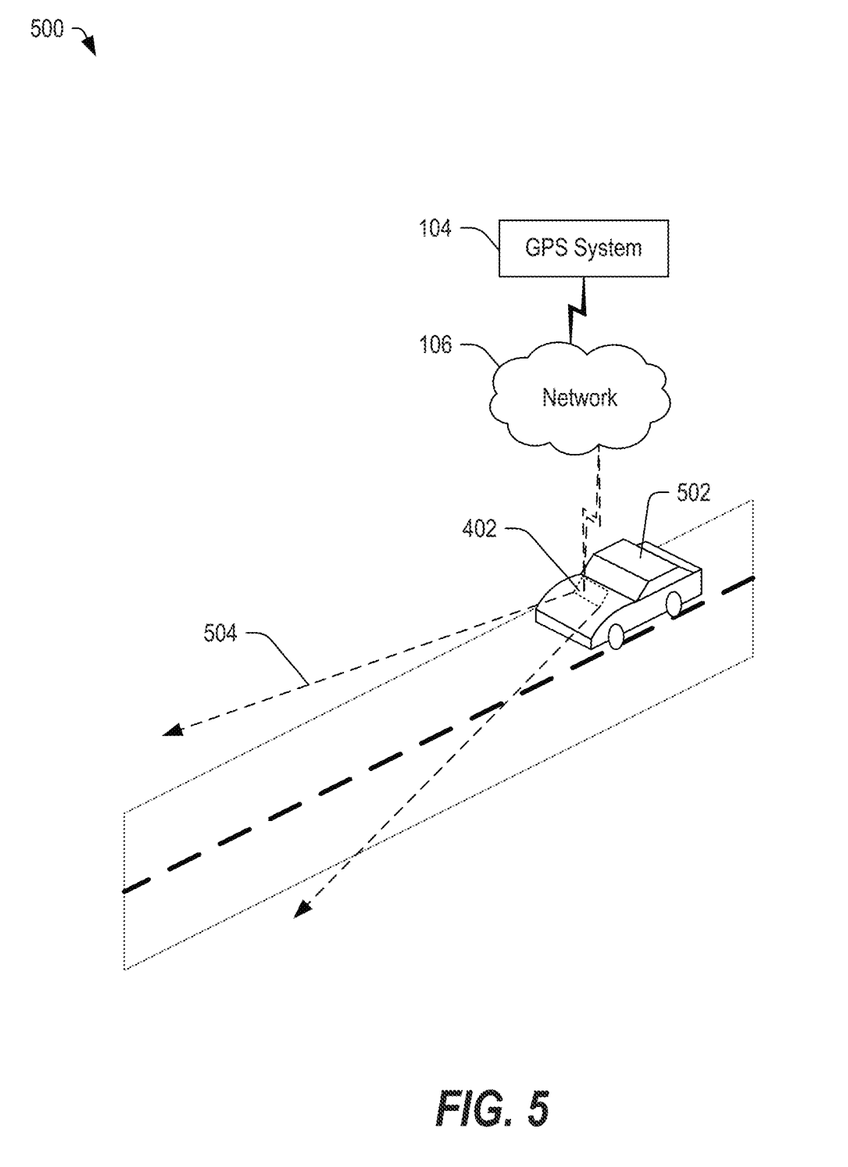
FIG. 5 is a diagram of an automotive system configured to track movement on a digital map based on sensor data, in accordance with some embodiments of the disclosure.

FIG. 5 is a diagram of an automotive system 500 configured to track movement on a digital map based on sensor data, in accordance with some embodiments of the disclosure. The automotive system 500 includes an automobile 602 including the automobile system 502 of FIG. 5 configured to communicate with a GPS system 104 via a network 106. When GPS is disabled or unavailable, the automobile system 502 may determine movement based on sensor data, based on optical data (as generally indicated by arrows 604), or any combination thereof and may update an indicator on a digital map on the touchscreen interface within the automobile 502 to reflect the movement on the digital map.

Figure 6:
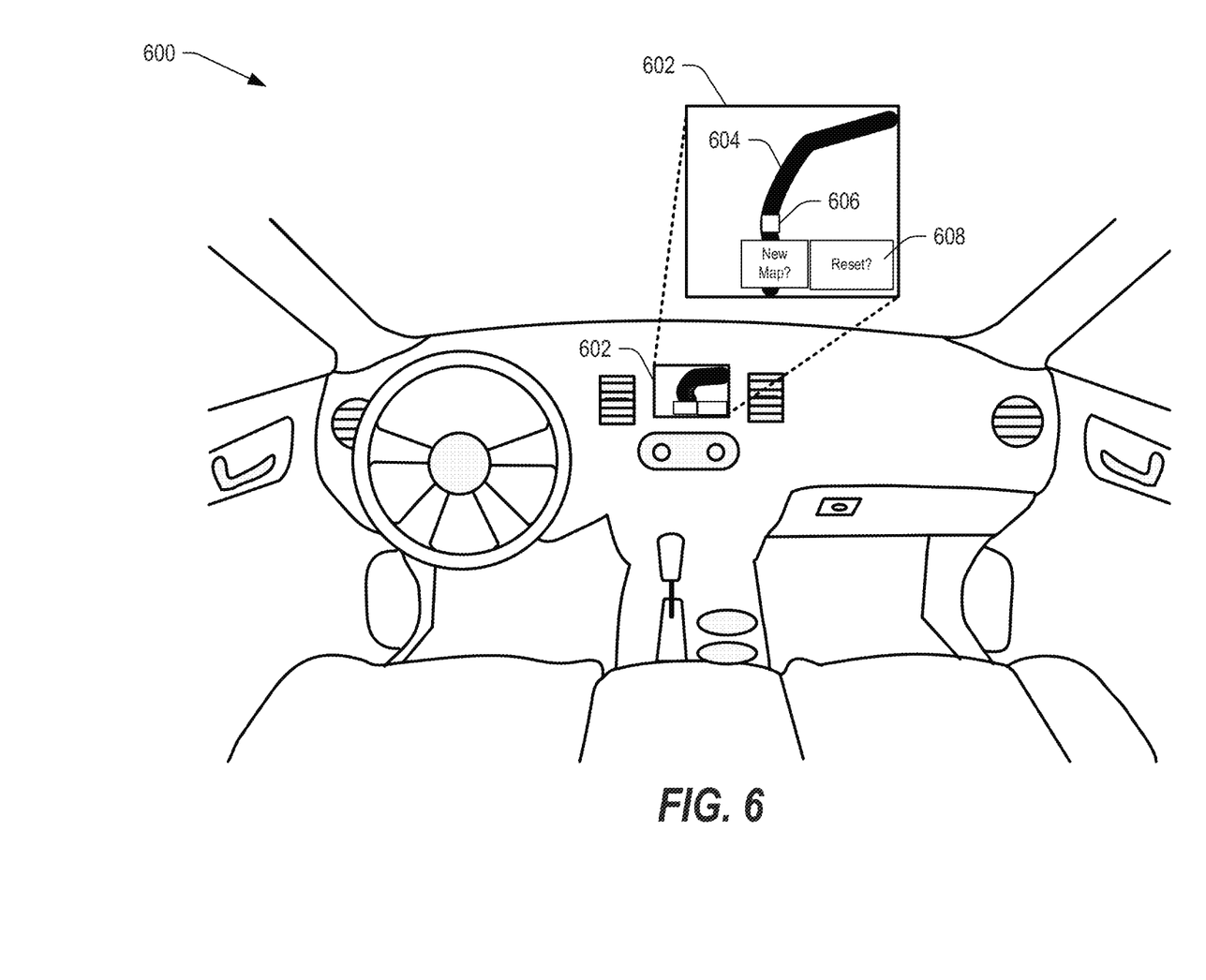
FIG. 6 is a diagram of an embodiment of an interior of the automotive system of FIG. 5.

FIG. 6 is a diagram 600 of an embodiment of an interior 600 of the automotive system 500 of FIG. 5. The interior includes a dashboard, a steering wheel, gear shift mechanism, air vents, and so on. In the center of the dashboard, the interior 600 may include a touchscreen display 602, on which a digital map may be displayed. In the illustrated example, the digital map may include an object or feature, such as a road 604 and an indicator 606 representing the position of the vehicle. The position of the vehicle may be a geophysical location that is correlated to the digital representation of the area on the touchscreen display 602. The touchscreen display 602 may further include user-selectable elements, such as buttons 608, with which the user may interact to update, reset, alter, or otherwise interact with the digital map.

It should be appreciated that automotive systems currently exist that utilize GPS data to update a visual indicator on a digital map to reflect the position of the vehicle. However, when GPS is no longer available, such existing systems can no longer update the position information. However, the automotive system 502 may continue to update the position information based on the movement data from the sensors, even when the GPS is not available.

In some embodiments, the digital maps may be stored in memory or retrieved as needed. In some embodiments, the digital maps may be pre-rendered to combine satellite and elevation data of real terrain into a virtual three-dimensional environment. The processor 404 may control presentation of the digital map on the touchscreen 115, and may adjust a position of an avatar (indicator) on the digital map and the automotive system 500 moves, progressing the avatar accurately using data input by physical measurement data (pace count (speed), altitude, direction, and other data) for the purpose of real world navigation. The automotive system 500 may utilize a "road lock" feature, which may prevent the processor 404 from plotting the avatar representing the automotive system 500 "off road" during ordinary transits. Any map and route information downloaded via GPS or other signals may be saved temporarily to the system 500, in case the user wants to enter shadow mode, then may be discarded upon completion.

While the examples of FIGS. 1-6 have been discussed with respect to pedestrian and automotive travel, it should be appreciated that the electronic devices, circuits, and methods may be applied to other modes of travel, including water transit, aerial transit, and so on. One example of an aeronautical implementation is described below with respect to FIG. 7.

Figure 7:
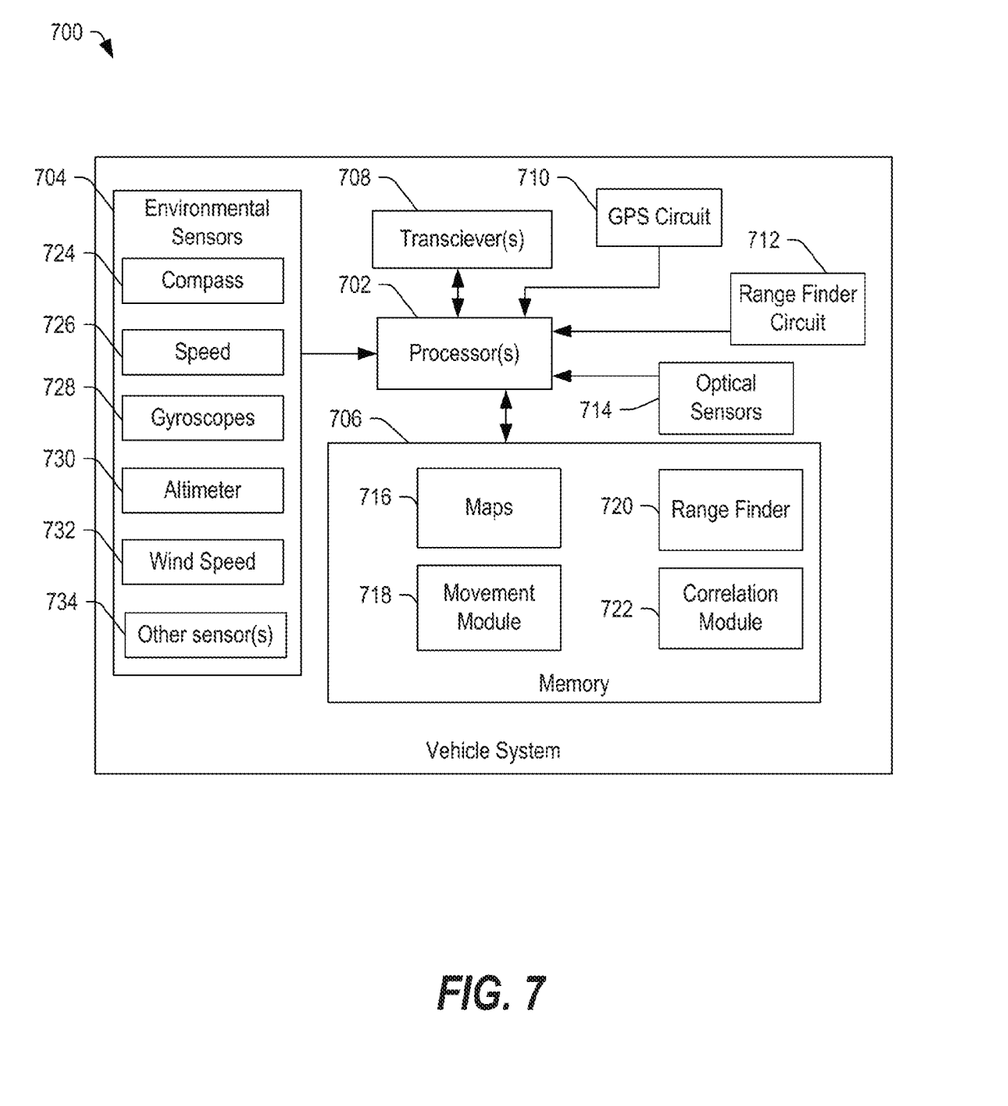
FIG. 7 is a block diagram of a system including a vehicle system configured to track movement on a digital map, in accordance with some embodiments of the disclosure.

FIG. 7 is a block diagram of a system 700 including a vehicle system configured to track movement on a digital map, in accordance with some embodiments of the disclosure. The system 700 may include one or more processors 702 coupled to a plurality of sensors 704 and to a memory 706. The system 700 may further include one or more transceivers 708 coupled to the one or more processors 702. The system 700 may also include a GPS circuit 710, a range finding circuit 712, and one or more optical sensors 714, which may be coupled to the one or more processors 702.

The memory 706 may store data and instructions that, when executed, cause the one or more processors to determine movement of the aeronautical vehicle system 700 and to correlate the movement to map data to determine positional data. In some embodiments, the memory 706 may store a plurality of maps 716, which may be topographical maps of areas over which the aeronautical vehicle is expected to fly. The memory 706 may also include a movement module 718 that, when executed, causes the processor 702 to detect movement based on data from the sensors 704. The sensors 704 may include a compass 724, an airspeed sensor 726, gyroscopes 728, an altimeter 730 a wind speed detector 732, and other sensors 734.

The memory 706 may also include a range finder module 720 that, when executed, causes the one or more processors 702 to control the range finder 712 to determine the range to various features on the ground. The memory 706 may also include a correlation module 722 that, when executed, causes the one or more processors 702 to correlate the range data, speed data, wind data, compass data, and other data to determine a position of the aeronautical vehicle relative to the ground and to determine the position of a digital avatar relative to a digital map.

In some embodiments, the digital maps 716 may be simplified to include features that are useful for navigation from the sky (such as roads, hills, mountain peaks, rivers, corresponding elevation data, etc.) to maximize storage capacity. The correlation module 722 may be executed by the processor 702 to correlate optical data from optical sensors 714 and other sensors 704 to features of a selected digital map, which may allow the system 700 to correlate maps to images of major roads and landmarks and including triangulation data from range finders, altitude information, optical spacing between geophysical features (for example, altitude information may be confirmed based on visual dispersion of roads or objects and their known spacing).

Wing mounted wind sensors may read the speed of the wind to determine airspeed. Additional, sensors may provide data corresponding to any effect from cross winds. In some embodiments, the sensors 704 may include gyroscopes 728 configured to read wing tilt, which may be checked against a compass 724, while additional gyroscopes may be used to read nose/tail tilt and may be checked against an altimeter 730. The input data from various sensors, such as the sensors 704, the optical sensors 714, the range finder circuit 712, other sensors, or any combination thereof, may be provided to the processor 702, which may determine the progress of the aircraft. Further, the various inputs may also be provided to the black box of the aeronautical vehicle so that loss of the GPS signal will no longer affect the accuracy of flight records.

In some embodiments, the optical sensors 714 may be configured to be downward facing and side facing in order to scan the terrain while a flight is in progress. As the other inputs place the aircraft as accurately as possible, under clear conditions, the optical data from the optical sensors 714 may allow the processor 702 determine the position of the aeronautical vehicle based on the three-dimensional digital map renderings based on actual elevation variances and road systems of the terrain over which the flight is traveling. By triangulation, the processor 702 may determine the position precisely from actual ground features, such as detectable landmarks (e.g., highways, rivers, mountains, etc.).

In some embodiments, the processor 702 may determine lateral drift based on optical data from the optical sensors 714 and based on directional data from the compass 724. The processor 702 may determine the lateral drift by comparing compass heading data with visual progress relative to surveyed features of a known heading. The information may be used to correct the heading based on the discrepancy between visual direction of travel and surveyed terrain features, such as coastlines, etc. Further, gyroscopic information from gyroscopes 728 may detect wing tilt to steady heading recognition and to automatically recalibrate the compass 724. When the heading is steady, and the gyroscopic sensors 728 may indicate that the wing are slightly canted, and the system 700 may recalibrate to recognize the present wing tilt as "straight." Further, nose/tail tilt data may be used to calibrate the altimeter 730. When there is no altitude change occurring, and the gyroscopic sensors 728 indicate that the nose and tail are slightly canted, the system 700 may recalibrate to recognize the present tilt as "straight."

Figure 8:
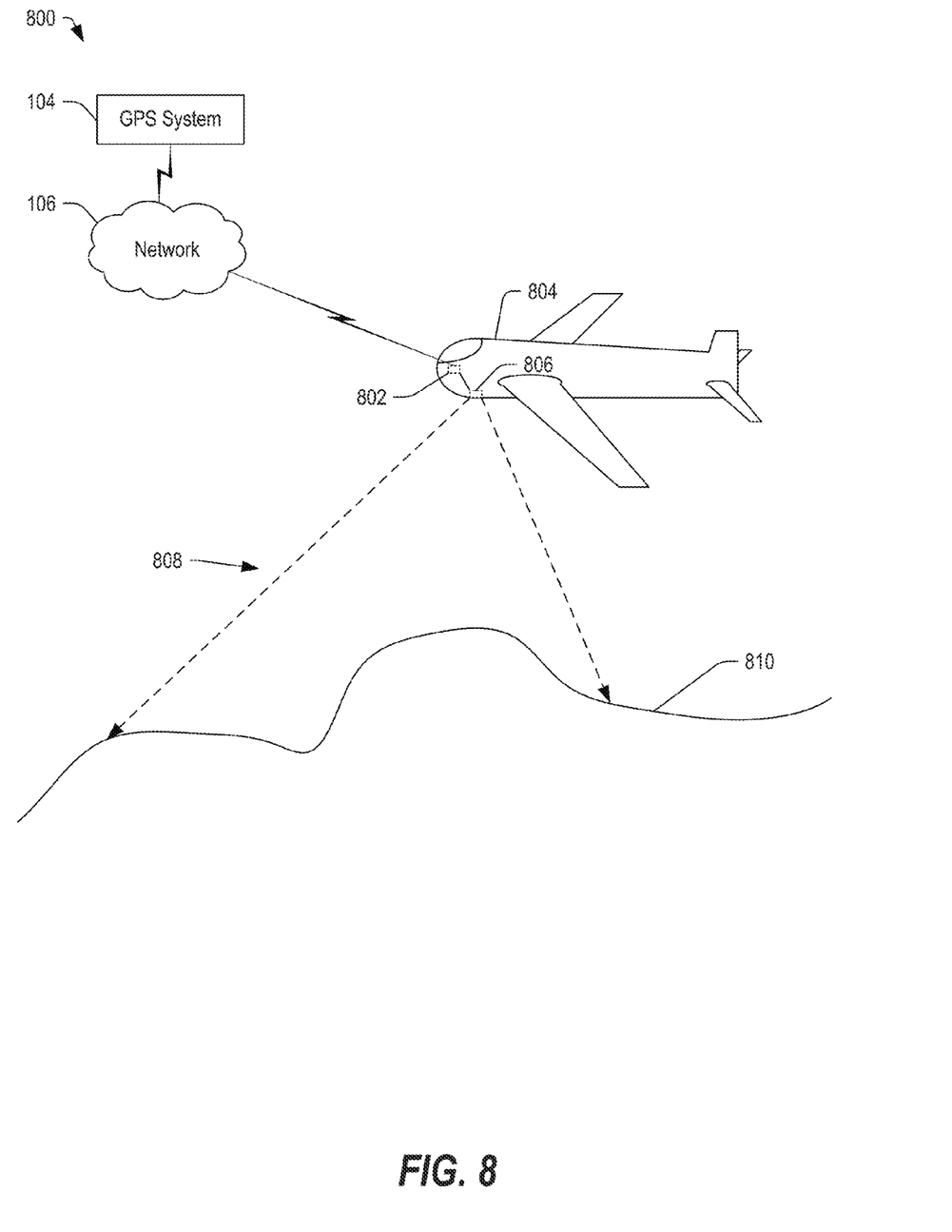
FIG. 8 is diagram of a system including an airplane configured to track movement on a digital map, in accordance with some embodiments of the disclosure.

FIG. 8 is diagram of a system 800 including an airplane 804 configured to track movement on a digital map, in accordance with some embodiments of the disclosure. The system 800 may include an aeronautical system 802, such as the vehicle system 700 in FIG. 7. The airplane 804 may include optical sensors 806, such as optical sensors 714 in FIG. 7, which may capture optical data of terrestrial features of the surface 810 within a field of view 808. The aeronautical system 802 may determine a position of the airplane 804 by correlating terrestrial features to landmark features of a digital map.

Figure 9:
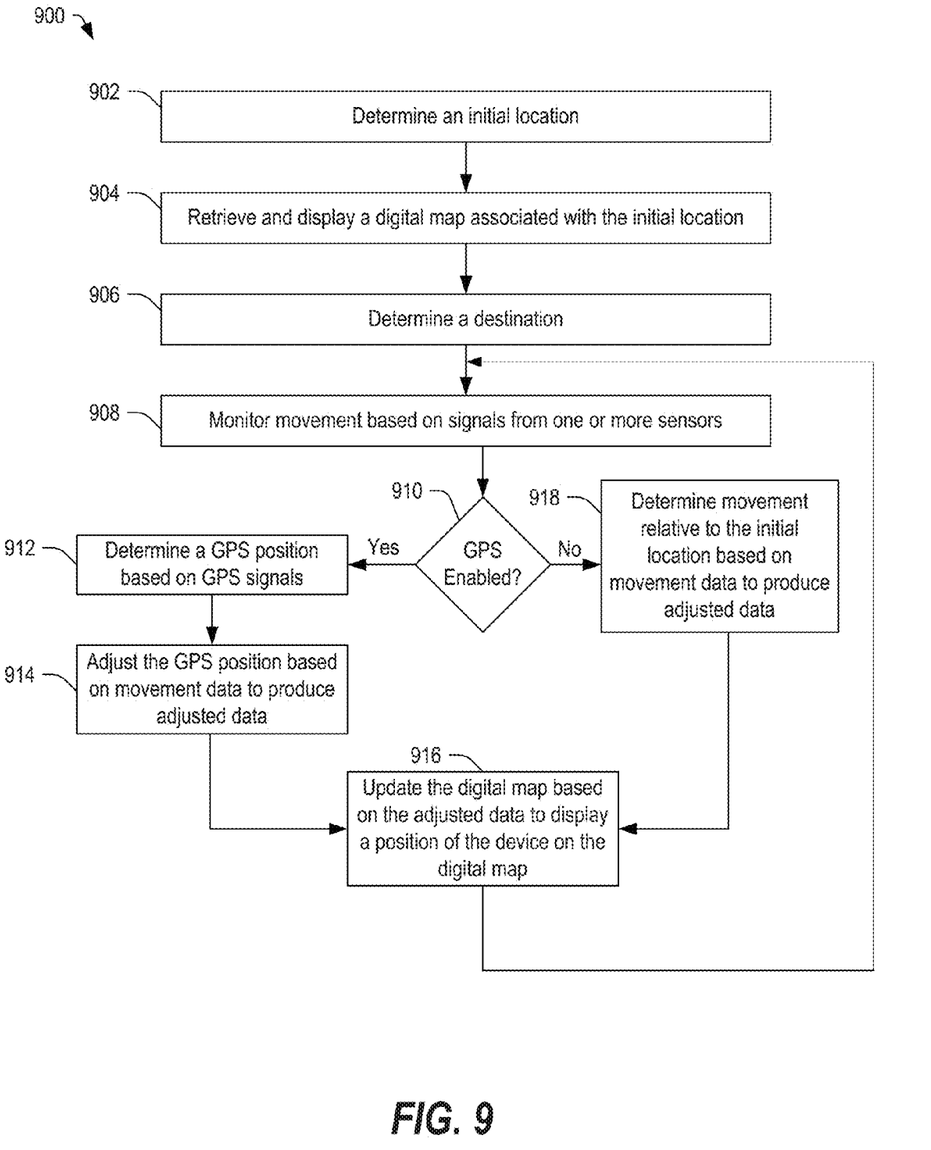
FIG. 9 is a flow diagram of a method of tracking movement on a digital map, in accordance with some embodiments of the disclosure.

FIG. 9 is a flow diagram of a method 900 of tracking movement on a digital map, in accordance with some embodiments of the disclosure. The method 900 can include determining an initial position, at 902. In some cases, the initial position may be determined using GPS coordinates received by a GPS circuit in an electronic circuit. In other embodiments, the initial position may be determined by processing data from sensors and cameras, and calibrating the data to known locations on a digital map. A digital map corresponding to the initial position may be loaded and displayed, at 904. In some cases, the digital map may be manually loaded by a user, or automatically loaded by an electronic circuit. In some cases, a user may optionally determine a destination at 906. The user may specify a selected destination by entering text or by interacting with a touchscreen to select a destination, and the electronic device may determine and display a suggested route in response to the selected destination.

The method 900 can include monitoring user movement based on signals from one or more sensors, at 908. The method may then determine if the GPS is enabled, at 910. In some embodiments, the electronic circuit may operate in a shadow mode, such as when the GPS circuit is disabled or GPS is unavailable. When the GPS is not enabled, the method 900 can include determining movement relative to the initial location based on movement and directional data to produce adjusted data, at 918. In some cases, adjusted data may be an updated position or location, which may be correlated to a position on a digital map. In some embodiments, the adjusted data may be determined based on speed data, altitude data, directional data, other data, or any combination thereof. Advancing to 916, the digital map may be updated based on the adjusted data to display a position of the device on the digital map. The method 900 then returns to 908 to monitor user movement based on signals from one or more sensors.

Returning to 910, when the GPS is enabled, the method 900 advances to 912 and an updated position may be determined based on the GPS signals. In some embodiments, the GPS signal may be intermittent or periodic, and may not have taken into account any movement of the user. In some embodiments, the GPS signals may specify a position within a range, which may be not be precisely correct. Continuing to 914, the updated position may be augmented with movement and directional data to produce adjusted data. Advancing to 916, the digital map may be updated based on the adjusted data to display a position of the device on the digital map. The method 900 then returns to 908 to monitor user movement based on signals from one or more sensors.

In some embodiments, the systems, circuits and methods described above may be applied in a nautical implementation. In some embodiments, the boat may include the circuitry of the electronic device 102 of FIG. 1. Further, the boat may include relative wind and/or underwater sensors configured to provide signal proportional to the speed of the boat. The boat may include a compass, which may be a gyroscopic x, y and z axis compass, and which may be calibrated by GPS. In some embodiments, pitch and roll may also be monitored and applied to calculate progress, based on previously gathered data on the effects of sea state, and efficiency for a vessel of a specific size and type. Set and drift tables may be applied to crosswind and current sensors, which may provide continuous input to account for lateral drift. In some embodiments, intermittent GPS fixes may be used to correct other inputs when the GPS signal is good.

If a three-dimensional map representation of the real world is available (created from sensors or otherwise provided), and the system may match the position of an avatar in the three-dimensional map to the user's position in the real world. In some embodiments, when the optical sensors are engaged, and images of the terrain ahead are captured by the sensors, the electronic device may display route lines and waypoint markers, which may be overlaid onto real terrain.

In some embodiments, three-dimensional geophysical rectification of map data may be possible. In a particular example, the optical sensors may capture images of the landscape and may adjust the orientation of the digital terrain of the digital map rendering to match the high points of the actual terrain, and may adjust the user's location based on the relative perspective.

In some embodiments, the electronic device 102 may be used to provide natural navigation. In certain embodiments, the electronic device may utilize digitally overlaid sun tables, altimeter, and clock data to derive a fix from the sun in the daytime. The device's optical sensors may be used to detect the precise bearing and altitude of the sun. Accounting for its own elevation above sea level, its orientation and angle, and the exact time of day, the electronic device may apply the location of the sun to sun tables stored in memory to determine the user's rough latitude and longitude location. Using digitally overlaid star tables, altimeter data, gyroscopic data and clock data, the electronic device may be able to determine the user's position from the stars at night. In some embodiments, the electronic device may include a digital "celestial sphere" application, which may be oriented by the user. Ideally, a very highly light sensitive optical sensor may capture one or more images of the night sky, while oriented in known directions. In some embodiments, the user interface may direct the user to orient the electronic device for each snapshot. Taking into account its altitude, angle, bearing and the time of night, the electronic device may rotate the celestial sphere within the application to match the orientation of the stars in the captured images and may then generate the user's location (in latitude and longitude), based on the orientation of the sphere. In another embodiment, the user may find a known star or constellation in the night sky. The user may input the name of the star or constellation into the application, preparing it for orientation. The electronic device may be pointed at the named star or constellation to read its own bearing and angle using the optical sensors. The electronic device may then determine its own position automatically. The process may be repeated with other stars or constellations to enhance accuracy.

The processes, machines, and manufactures (and improvements thereof) described herein are particularly useful improvements for computing devices used for navigation. Further, the embodiments and examples herein provide improvements in the technology of navigation systems, and particularly those devices that may rely on GPS data, which may be intermittently unavailable. In addition, embodiments and examples herein provide improvements to the functioning of an electronic device that provides navigational assistance by utilizing motion sensors, optical sensors, directional sensors, range data, or any combination thereof, to determine a physical position of the device, thereby creating a specific purpose computer by adding such technology. The physical position data may be used to update a digital representation of the position on a digital map, even when GPS data is not available. Thus, the improvements herein provide for technical advantages, such as providing a navigation system that may operate in adverse conditions, in remote locations, or even under ground. For example, the systems and processes described herein can be particularly useful to any systems in which a user may want to explore an area that lacks GPS signal access. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

Although the present invention has been described with reference to preferred embodiments, workers skilled in the art will recognize that changes may be made in form and detail without departing from the scope of the invention.

What is claimed is:

1. An apparatus comprising:
   a circuit including:
      a first input to receive motion data from a motion sensor;
      a second input to receive optical data from an optical sensor;
      a third input to receive directional data corresponding to the motion data;
      an input/output interface configured to provide data to a display; and
      a control circuit coupled to the first input, the second input, the third input, and the input/output interface, the control circuit configured to:
         determine a current position based at least in part on the motion data and the directional data; and
         update an indicator on a digital map provided to the display based on the current position determined from the motion data.

2. The apparatus of claim 1, wherein the control circuit is configured to correlate image data from the optical sensor to a feature identifiable on the digital map to determine the current position and to update the indicator on the digital map based on the current position.

3. The apparatus of claim 1, wherein the control circuit is configured to correlate movement data from the motion sensor and the direction data to determine the current position relative to an initial position and to update the indicator on the digital map based on the current position.

4. The apparatus of claim 1, further comprising:
   a global positioning satellite (GPS) circuit configured to capture GPS data; and
   the control circuit is configured to determine the current position based on at least one of the GPS data and the motion data.

5. The apparatus of claim 4, wherein the control circuit is configured to:
   calibrate the motion data using the GPS data during a first mode; and
   determine the current position based on the motion data in a second mode.

6. The apparatus of claim 4, further comprising an input/output (I/O) interface including at least one user-selectable element accessible by a user to selectively disable the GPS circuit.

7. The apparatus of claim 1, further comprising:
an input/output (I/O) interface configured to couple to an external device and to communicate data related to at least one of the digital map and the current position to the external device; and
wherein the external device comprises at least one of a computing system, an automotive system, a nautical system, and an aeronautical system.

8. A method comprising:
determining a current position based on data from at least one of a motion sensor and an optical sensor of an apparatus; and
updating an indicator representing the current position on a digital map provided to a display associated with the apparatus in response to determining the current position.

9. The method of claim 8, further comprising:
determining an initial position using global positioning satellite (GPS) coordinates from a GPS circuit of the apparatus; and
determining the digital map from a plurality of digital maps in response to determining the initial position using a control circuit of the apparatus.

10. The method of claim 9, wherein determining the map comprises retrieving one or more maps from a memory in response to determining the initial position.

11. The method of claim 8, wherein determining the current position comprises:
receiving motion data from the motion sensor;
receiving directional data from a compass; and
determining the current position based on the motion data and the directional data.

12. The method of claim 8, wherein updating the indicator representing the current position comprises:
correlating the current position to the digital map; and
updating the indicator in response to correlating.

13. The method of claim 8, wherein determining the current position comprises:
receiving image data from the image sensor; and
identifying features within the image data that correspond to features within the digital map to determine the current position.

14. The method of claim 13, wherein identifying the features within the image data comprises correlating the features to corresponding features within the digital map.

15. The method of claim 8, further comprising:
receiving an input to calibrate the current position to a known feature within the digital map; and
updating the current position in response to receiving the input.

16. A data storage device comprising instructions that, when executed, cause a processor to:
determine a current position based on data from at least one of a motion sensor and an optical sensor; and
update a position of an indicator on a digital map based on the current position.

17. The data storage device of claim 16, further comprising instructions that, when executed, cause the processor to:
determine an initial position based on global positioning satellite (GPS) coordinates; and
determine the current position relative to the initial position.

18. The data storage device of claim 16, further comprising instructions that, when executed, cause the processor to:
receive global positioning satellite coordinates; and
calibrate the data from the at least one of the motion sensor and the optical sensor in response to receiving the global positioning satellite coordinates.

19. The data storage device of claim 18, further comprising instructions that, when executed, cause the processor to selectively disable a global positioning satellite circuit.

20. The data storage device of claim 16, further comprising instructions that, when executed, cause the processor to communicate with a vehicle system associated with at least one of a car and a boat.

* * * * *